April 15, 1969  D. B. ATKINS  3,438,080
COMBINED SOFT CLOTH AND HARD COARSE CORD BUFF
Filed April 27, 1967  Sheet 1 of 2
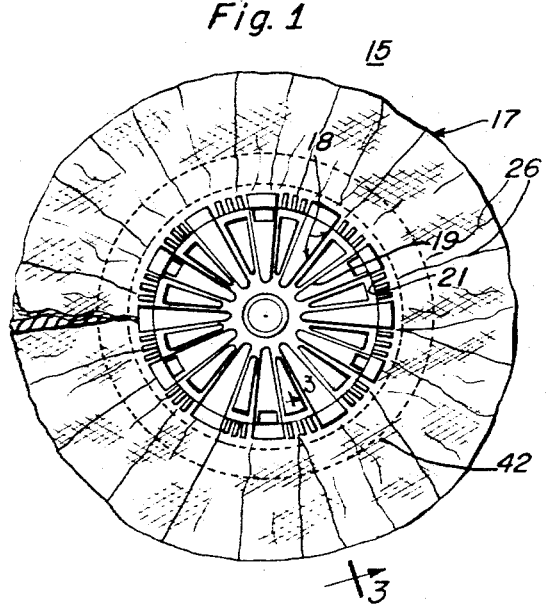
Fig. 1
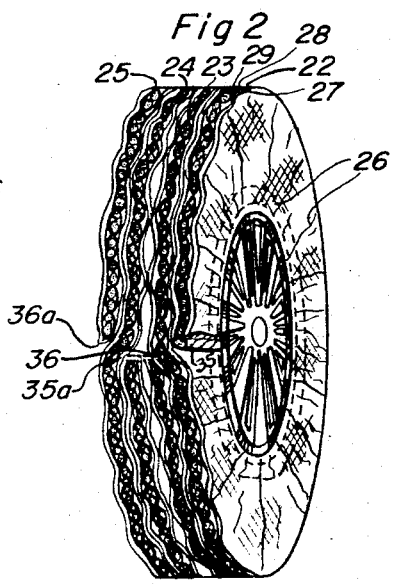
Fig. 2
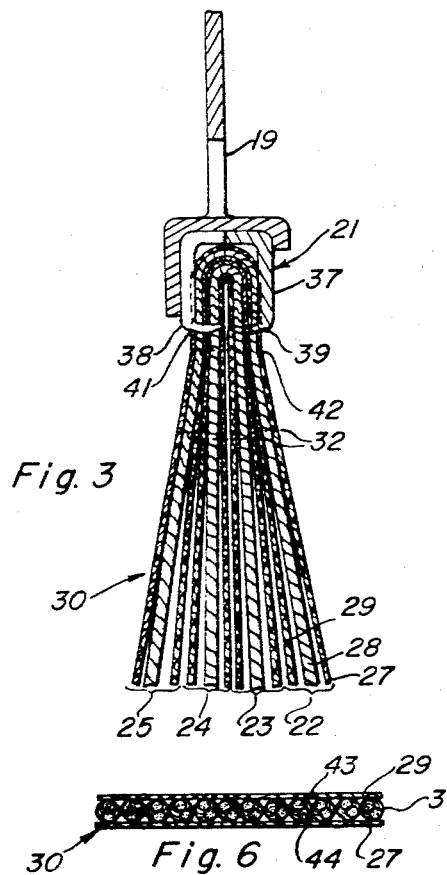
Fig. 3
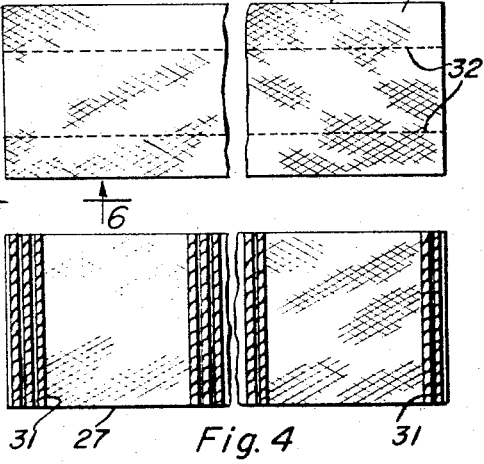
Fig. 5
Fig. 4
Fig. 6
INVENTOR.
DAVID B. ATKINS
BY PENDLETON, NEUMAN
SEIBOLD & WILLIAMS
ATTORNEYS

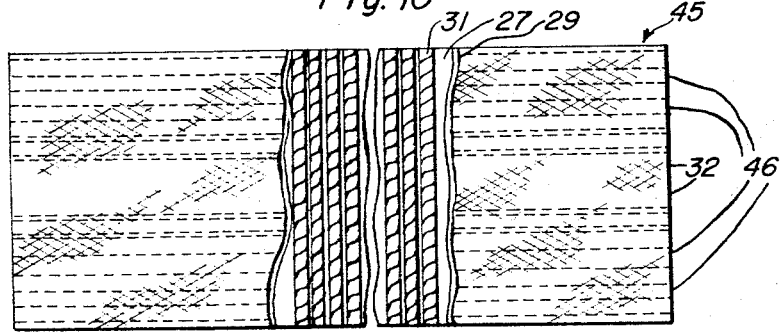
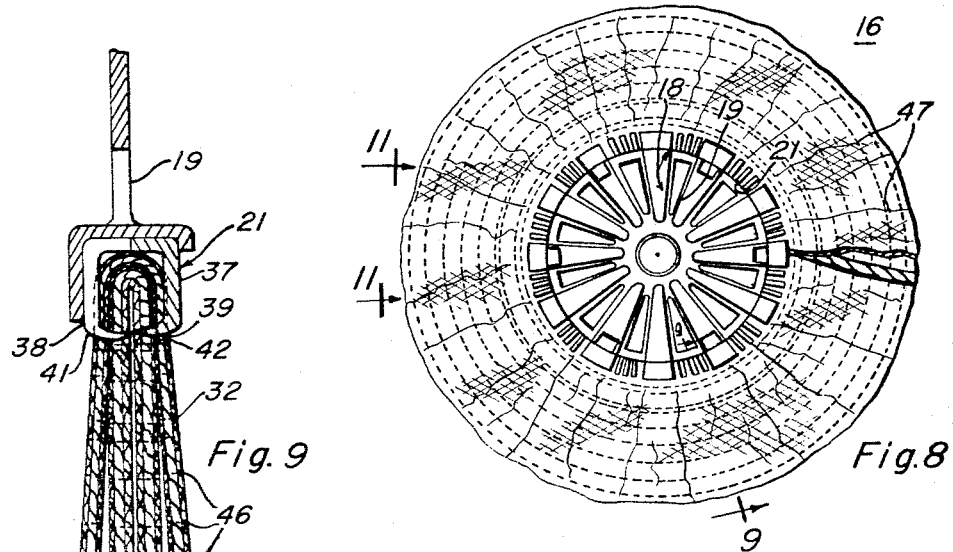
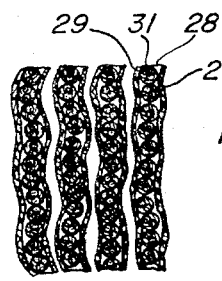
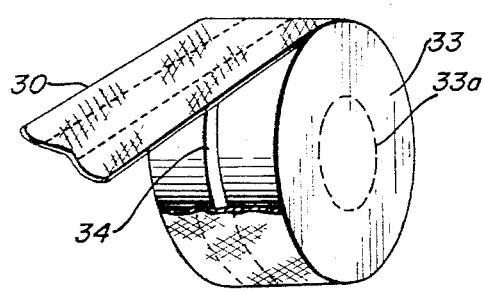

United States Patent Office 3,438,080
Patented Apr. 15, 1969

3,438,080
COMBINED SOFT CLOTH AND HARD COARSE CORD BUFF
David B. Atkins, Chicago, Ill., assignor, by mesne assignments, to Jackson Buff Corporation, Conover, N.C., a corporation of North Carolina
Filed Apr. 27, 1967, Ser. No. 634,193
Int. Cl. A47l 21/00, 25/08
U.S. Cl. 15—230.13          5 Claims

ABSTRACT OF THE DISCLOSURE

A cord and cloth buff wherein an initially flat laminar strip is formed into a pair of spiral laminar sheets about a central hub, each sheet comprising undulatory convolutions which are separate and discrete from one another. In one form, two layers of bias cut cloth (such as fine fibered cotton) are separated by a layer of substantially parallel transverse coarse cords (such as two ply laid sisal) and one or more initially applied lineal rows of stitching hold the cloth and cords together in flat strips. When central portions of the sheets are secured to the hub, peripheral portions extend radially from the hub with a circular row of stitching formed by the initially applied lineal row of stitching.

BACKGROUND OF THE INVENTION

The field of the invention relates to flexible buffs made of soft cloth and coarse cords for performing polishing, buffing and coloring steps in one operation. More particularly the inventive field relates to flexible buffs of this nature wherein streaking of the work is minimized, if not avoided completely, even at light operating pressures. Improved flexibility and control of flexibility of the buff are achieved. It is an object to provide an improved buff of this character.

Spiral convoluted undulatory sheet buffs are known to the prior art. These include such buffs in which a layer of woven, bias cut soft cloth is combined with a woven, bias cut coarse cord layer which by its nature has an inherent stiffness or lack of flexibility as exemplified by Mockiewicz, Patents Nos. 2,803,097 and 2,803,096 and Davies Patent No. 2,642,706. Buffs of radial ropes alternated with layers of regularly cut woven cloth wherein all layers in the circular state are stitched together to make an essentially monolithic structure are also known to the art, as exemplified by Seybert, Patent No. 2,090,814.

The basic problem to be solved in providing a buff for polishing, buffing and coloring is that of carrying out the indicated operations without streaking of the work material under light operating pressures as well as heavy operating pressures, and to do so in an economical manner. The ability to vary the amount of cutting or polishing characteristics as compared with the amount of buffing or coloring characteristics of a buff poses another major problem. Greater wearability and decreased fraying out of the buff material are also desirable achievements. It is a further object of the invention to provide solutions to these problems.

It is a further object of the invention to provide an improved buff of the character indicated having a brush-like working surface and yet having enhanced wearability.

SUMMARY

In carrying out the invention in one form there is provided a buffing wheel, including a central hub and a plurality of discrete undulatory buff convolutions, each convolution comprising a laminar member formed as an annulus about said hub and having at least one soft, tightly woven, fine fibered cloth layer attached to said hub and terminating at a circular periphery, and a layer of hard, coarse cords extending radially from the hub to the periphery. In a preliminary stage of buff construction, the coarse cords are placed in a layer transversely of a strip of bias cut cloth, are distributed evenly along such strip and one or more rows of linear stitching are applied to hold the cords and cloth together.

In a preferred embodiment the soft cloth is bias cut, the cords are of two ply laid sisal placed between two layers of cloth and the sheets of cords and cloth are stitched together along a circular path beyond the rim of the hub. The number of cords in one layer and the number of layers of cords may be varied, the number of layers of cloth and the number of rows of linear stitching, initially applied, all may be varied relative to each other in the interest of achieving improved flexibility, control of flexibility and control of the ratio of amount of cloth to amount of cords.

BRIEF DESCRIPTION OF THE DRAWINGS

FIGURE 1 is an elevational view of a buff embodying the invention;
FIG. 2 is a perspective view of the buff shown in FIG. 1;
FIG. 3 is a sectional view on a larger scale taken substantially in the direction of arrows 3—3 of FIG. 1;
FIG. 4 is a plan view of a laminar combination of buff components in one stage of construction;
FIG. 5 is a plan view of the buff components in a subsequent stage of construction;
FIG. 6 is an elevational view taken substantially in the direction of arrows 6—6 of FIG. 5;
FIG. 7 is a schematic perspective view illustrating a typical further step in the construction of a buff according to the invention;
FIG. 8 is an elevational view of a further form of buff embodying the invention;
FIG. 9 is a sectional view taken substantially in the direction of arrows 9—9 of FIG. 8;
FIG. 10 is a plan view of certain of the buff components of FIGS. 8 and 9 in one stage of buff construction; and
FIG. 11 is a view taken substantially in the direction of arrows 11—11 of FIG. 8.

DESCRIPTION OF THE PREFERRED EMBODIMENTS

Referring more particularly to the drawings, the invention is shown embodied in buffs 15 and 16. Referring first to buff 15 (FIGS. 1–7), the buff comprises a buff component 17 and a supporting or hub component 18, the latter comprising, for example, a spider framework 19 and a clinch ring 21.

The buff component 17, as seen best in FIGS. 2 and 3, comprises a series of four convolutions, 22, 23, 24 and 25 which are separate and discrete. In one form of the invention, all of the convolutions are part of a single piece of material as will be subsequently described. Convolutions 22 and 23 are part of one continuous undulatory spiral sheet, and convolutions 24 and 25 are part of a separate continuous unduatory spiral sheet, as may be visualized in FIG. 2. The undulations in the convolutions at the outer periphery thereof become folds, pleats or puckers at the points where the buff component 17 joints the clinch ring 21, the folds, pleats or puckers being shown schematically as, for example, by the lines or striations 26. Each of the convolutions 22, 23, 24 and 25 consists of a layer of cloth 27, a layer of cords 28, and a further layer of cloth 29.

It will be understood that more or less convolutions may be utilized depending upon the particular construction desired and upon the method of assembling used, within the skill of the art. The convolutions need not be continuous but may consists of a number of similar parts disposed essentially in edge to edge relationship.

Referring to FIGS. 4, 5, 6 and 7, the manner of constructing the particular buff may be understood. A layer of cloth 27, which may be of soft, relatively finely woven cotton, for example, is cut on the bias (as shown by the diagonally intersecting cross-hatching on FIGS. 4 and 5) into a rectangular strip of appropriate length, as will become clear. Disposed upon the cloth layer 27 and uniformly distributed over its full length, is a series of coarse cords 31 which ultimately form the cord layer 28, the length of cords 31 being essentially the same as the width of the cloth strip. Thereafter the further layer of cloth 29 which may be the same as or differ from cloth 27 is disposed over the cords 31 (in layer 28) to form a sandwich-like or laminar construction, as may be visualized in FIGS. 5 and 6. Following this arrangement of fabric and cords, two lineal rows of stitches 32 as shown, or the like, may be applied in any well known manner in order to hold the two layers of cloth and the filling layer of cords together as a unit or strip 30. More or less lineal rows of stitches may be applied for controlling the relative flexibility of the buff layers as well as of the completed buff, according to an important aspect of the invention.

One manner of forming the strip of combined cloth and cords into a spirally convoluted undulatory buff, as seen in FIG. 2, is to wind the strip 30 around a split drum 33 of one diameter, for example, as may be seen in FIG. 7, followed by forming or forcing the strip along a circular center line or circle, as a doubled layer, into the split 34 of the drum. One such operation is described in a patent to Davies, No. 2,642,706, above referred to. Any other methods for this purpose known to those skilled in the art may be used.

To achieve a buff of four convolutions, as illustrated in FIG. 2, the length of the strip shown in FIGS. 4 and 5 is such as to form two layers wound about the periphery of drum 33, as may be visualized in FIG. 7. The forming or forcing of the wound up strip 30 into the slot or split 34 between the two halves of the cylindrical drum 33 causes the material to assume the doubled back form as may be seen best in FIG. 3. When the material is forced into the slot 34, as described, the diameter changes from that of the cylinder, which, in one practical form, may be about 14 inches, to a diameter as shown by the dotted circle 33a in FIG. 7, which in the same practical case may be about 7 inches. The change in diameter causes the material to fold, pleat or pucker in order to accommodate all of the available material at the smaller diameter. The pleats, folds or puckers continue toward the periphery, resulting in the undulatory or wavy configuration already described.

The strip 30 wound into a two layer flat or cylindrical spiral around drum 33, when doubled into the form shown in FIG. 3, becomes four spiral convolutions, annular and undulatory in form. As may be seen in FIG. 2, after deformation, the strip 30 has a starting point 35 and an ending point 36, the strip in between being in the form of an annular spiral sheet. The same deformation, of course, results in a second spiral sheet having its starting point at 35a and its terminal point at 36a.

After the strip 30 has been deformed into the spiral sheets having the desired inner diameter, the inner diameter will conform to that of the open clinch ring 21, whose prongs are shown as 37 and 38 in FIG. 3. The prongs 37 and 38 alternate with respect to each other on opposite sides of the buff and are provided at their outer ends with teeth 39 and 41, respectively, which are pushed together so that the teeth are forced into the folded buff layers 22, 23, 24 and 25. In this manner, the buff portion 17 is firmly held within the clinch ring. If additional holding together of the buff layers is desired a circular row of stitches 42 may be applied by any suitable sewing machine, for example.

The rows of stitches 32, as shown in FIG. 5, appear as illustrated in FIG. 3, with that portion of the row of stitches 32 applicable to the inner layers of the buff material appearing at a slightly greater diameter than that portion of the row of stitches applicable to the outer layers of material, because of the greater radial distance involved in forming the bend or bight within the clinch ring.

More than one layer of cloth material may be used, and varying types of this material may be used, as is well known to the art, in order to produce the desired buffing and coloring attributes. In some cases the cloth may be omitted. Correspondingly, while only one layer of cords, which may, for example, be made from any one of the group consisting of jute, sisal and hemp, is shown, more than one layer may be used, if desired, in order to provide a thicker buff for increased wearability as well as increased polishing or cutting effect. Similarly more or less cords may be used in a single layer. A buff having a greater ratio of cloth to cords will have more buffing effect relative to polishing or cutting effect and will have enhanced buffing compound retention properties, the latter being a function of the cloth. Similarly a buff having a greater ratio of cords to cloth will have a greater capability for polishing or cutting as compared with buffing.

In the final product, as may be visualized in FIG. 3, the cords 31 extend radially and are, in effect, loose except as held by the rows of stitches 42 and 32. The resulting buff is therefore quite flexible, since the soft cloth layers 27 and 29 do not add substantially to the buff rigidity. The cloth strips 27 and 29 and the cords 31 are continuous around the bend or bight within the clinch ring. Additional strength for withstanding the acting centrifugal force is thus obtained.

In the particular form being described, the cords 31 are shown as being of two-ply laid material, for example sisal, the plies being shown by way of example by reference characters 43 and 44. If desired, a greater or lesser number of plies may be used and the material may be laid or merely twisted, if desired, for the particular buff. As has already been referred to, the soft cloth material 27, 29 is bias cut, in order to provide better buffing and durability in the completed buff.

By distributing the cords, properly cut to length, in a layer, as shown in FIG. 4, an even distribution of cords is obtained through the entire periphery of the completed buff. Bunching of the cords is avoided and as a result the completed buff has a higher degree of balance than prior buffs. Improved balance gives longer life and better performance of the buffs in the course of polishing, buffing and coloring operations. Economy of buff use time is also achieved in reducing machine set up time because less time is needed for balancing individual buffs or shifting buffs around on a shaft in order to achieve balance of all the buffs and hence decreased vibration.

The undulations appearing in the outer periphery of the buffing convolutions avoid streaking of the material being polished and buffed, inasmuch as the undulations are random in disposition and there is no single line of action of the buff parts against the material. Light pressure of the buff surface against the work, insufficient to produce any major buff deformation, is all that is necessary.

A stiffer buff may be obtained by applying a greater number of lineal rows of stitching than the holding rows 32. Referring now to FIGS. 8–11, there is shown a stiffer buff but one which is more flexible than prior art buffs, and in FIG. 10 there is shown a strip 45 of buff material which comprises two layers of cloth 27 and 29 and a layer 28 of cords 31 in between all securely attached together by fourteen additional rows of stitches 46 applied along the whole length of the strip. The lineal rows of stitches in effect become spiral rows of stitches when the buff strip is deformed, as described in connection with FIGS. 1–7, in order to give the annular undulating spiral sheet, as may be visualized in FIGS. 8 and 11. The manner of formation of the buff shown in the latter figures is the same as that described in the preceding figures. Likewise, the clinch ring 21 and the rows of stitches 32 are applied to the buff proper in the same manner as described.

Referring to FIG. 9, it will be seen that the cords 31 and the bias cut cloth strips 27 and 29 are held closely together, thereby providing a more rigid buff. The peripheral contour of the more rigid buff is still undulatory, as may be observed in FIGS. 8 and 11 and shown by the radial lines or striations 47. The cords 31 extending radially in the construction of FIG. 9, as in the construction of FIG. 3, results in a more flexible buff than is obtained in prior art constructions, wherein the sisal material corresponding to cords 31 is woven sisal cut on the bias. The degree of flexibility achievable while retaining durability and balance is much enhanced by the buff according to the invention as compared with buffs known in the prior art.

After the clinch ring 21 is applied to the buff material in either of the disclosed forms, the spider member 19 is attached to the clinch ring to form the completed hub, as is well known. See, for example, Patent No. 2,803,097, referred to above.

While particular embodiments of the invention have been shown, it will be understood, of course, that the invention is not limited thereto since many modifications may be made, and it is, therefore, contemplated by the appended claims to cover any such modifications as fell within the true spirit and scope of the invention.

The invention having thus been described, what is claimed and desired to be secured by Letters Patent is:

1. In a buffing wheel including a central hub and a pair of laminar sheets each having convolutions formed from an initially flat strip into the configuration of undulatory spirals about said central hub in which the convolutions of each of said spirals are discrete and separate from one another, the improvement wherein each sheet comprises one soft, bias cut cloth layer along one side extending radially from said hub to a circular periphery, a layer of cords extending radially from said hub to such periphery next to said one layer and a second soft, bias cut cloth layer next to said cord layer opposite to said one layer.

2. The invention according to claim 1 including a row of stitches connecting the cloth layers and the cord layers applied lineally while the laminar sheets are in a flat strip, and a circular row of stitching radially outward of the hub holding all of the convolutions together.

3. The invention according to claim 1 wherein the undulatory configuration comprises radially extending puckers disposed over the whole of each convolution, the puckers being closer together adjacent said hub than at the periphery of the buffing wheel.

4. The invention according to claim 1 wherein a plurality of lineal rows of stitches are applied while the laminar sheets are in a flat strip.

5. In a buffing wheel including a central hub and at least one laminar sheet having convolutions formed from an initially flat strip into the configuration of undulatory spirals about said central hub in which the convolutions of each spiral are discrete and separate from one another; the improvement wherein the sheet comprises a soft, bias cut cloth layer along one side extending radially from said hub to a circular periphery, a layer of cords disposed on the cloth layer and extending radially from said hub to said periphery next to the cloth layer, and a means connecting the layer of cords to the cloth layer.

References Cited

UNITED STATES PATENTS

| | | | |
|---|---|---|---|
| 2,236,444 | 3/1941 | Peterson et al. | 15—230.1 |
| 2,493,791 | 1/1950 | Walling | 15—230.15 |
| 2,704,854 | 3/1955 | Peterson | 15—182 |
| 2,724,937 | 11/1955 | Churchill | 15—230.13 |
| 2,803,096 | 8/1957 | Mockiewicz | 15—230.14 |
| 2,913,856 | 11/1959 | Carlton | 15—230.14 |

FOREIGN PATENTS

| | | |
|---|---|---|
| 495,701 | 11/1938 | Great Britain. |
| 906,510 | 9/1962 | Great Britain. |
| 297,923 | 6/1954 | Switzerland. |

DANIEL BLUM, *Primary Examiner.*

U.S. Cl. X.R.

15—230.15